United States Patent [19]
Linthicum et al.

[11] 3,767,218
[45] Oct. 23, 1973

[54] TOOL CHUCK
[75] Inventors: Harley E. Linthicum; William A. Linthicum; William B. Bronne, all of Springfield, Ohio
[73] Assignee: Carrier Corporation, Syracuse, N.Y.
[22] Filed: Feb. 21, 1973
[21] Appl. No.: 334,511

Related U.S. Application Data
[63] Continuation of Ser. No. 192,404, Oct. 26, 1971, abandoned.

[52] U.S. Cl. .................................. 279/75, 279/82
[51] Int. Cl. ............................................ B23b 31/22
[58] Field of Search ...... 279/75, 82, 76, 102, 279/22

[56] References Cited
FOREIGN PATENTS OR APPLICATIONS
651,556   4/1951   Great Britain ................... 279/22

Primary Examiner—Gil Weidenfeld
Attorney—J. Raymond Curtin

[57] ABSTRACT

A ball chuck employing sets of circumferentially spaced balls for retaining a tool in the chuck in accurate alignment and providing a driving connection between the chuck and the tool.

3 Claims, 2 Drawing Figures

Patented Oct. 23, 1973

3,767,218

TOOL CHUCK

This application is a continuation of application Ser. No. 192,404, filed Oct. 26, 1971 and now abandoned.

BACKGROUND OF THE INVENTION

This invention relates in general to tool chucking devices and in particular to quick release ball type chucking devices, suitable for use with long tools operating at high speeds.

Various types of chucking devices are used to hold a tool or work piece in operable position during machining operations. Chucks which require accurate alignment are usually complicated and expensive and require considerable operator setup time. Chucks which are designed for ease of installation, such as quick release chucks, do not have the accuracy of alignment required for particular applications. Due to manufacturing tolerances and/or wear, tools in quick release chucks are not always centered accurately or solidly within the chuck. Accurate alignment of a rotatable tool becomes a serious factor as the tool increases in length. This is particularly true at higher operating speeds or with hand held tools. A slight misalignment of a rotating tool at the connection of the tool to the drive source is magnified at the work tip of the tool in proportion to the length of the tool. Such misalignment results in the work tip of the tool moving in a circle about the axial center of the driving member, producing a "wobble." In hand held tools such as tube expanders used to mount heat exchange tubes in headers or fastener driving means and drills which require an extended length of tool, the misalignment or wobble produced at the tip of the tool requires special handling and precautions by the operator, resulting in a decrease in efficiency. At high operating speeds the wobble is further accentuated, requiring additional precautions.

SUMMARY OF THE INVENTION

It is therefore an object of this invention to hold a tool in a chuck in accurate axial alignment;

it is a further object of this invention to eliminate misalignment and wobble from quick release type chucks;

it is also an object of this invention to provide a quick release type chuck which will hold a tool in accurate axial alignment.

These and other objects of this invention are attained by means of a tool chuck comprising a body member having at least a first and a second set of balls movably mounted therein and projecting into a central axial bore formed within the body member and projecting beyond the exterior surface of the body member. An outer sleeve, having a tapered bore therein is adapted to contact the outer surface of the sets of balls, whereby movement of the sleeve relative to the body member in the direction of increasing bore diameter causes the balls to be displaced radially inwardly to engage a tool shank disposed within the bore of the body member. The sleeve has two internal bearing surfaces which are concentric with each other and which engage the outer surface of the body member to concentrically align the sleeve and tapered surface with the body member and the axial bore in the body member. Sliding movement of the sleeve along the body member will cause the tapered surface to uniformly contact the surfaces of the balls forcing the balls inward into contact with a tool shank in the axial bore. The two bearing surfaces prevent radial or misalignment type of movement between the sleeve and the body member. The concentricity of the tapered surface, the bearing surfaces, the axial bore and the center line of the body member cause uniform pressure against the balls and the tool shank resulting in accurate alignment of the tool with the body member. If the shank of the tool has uniform flat surfaces co-acting with the balls the tool is held rigid relative to the body member and rotary driving movement of the body member is imparted to the tool.

DESCRIPTION OF THE PREFERRED EMBODIMENT

Figure 1:
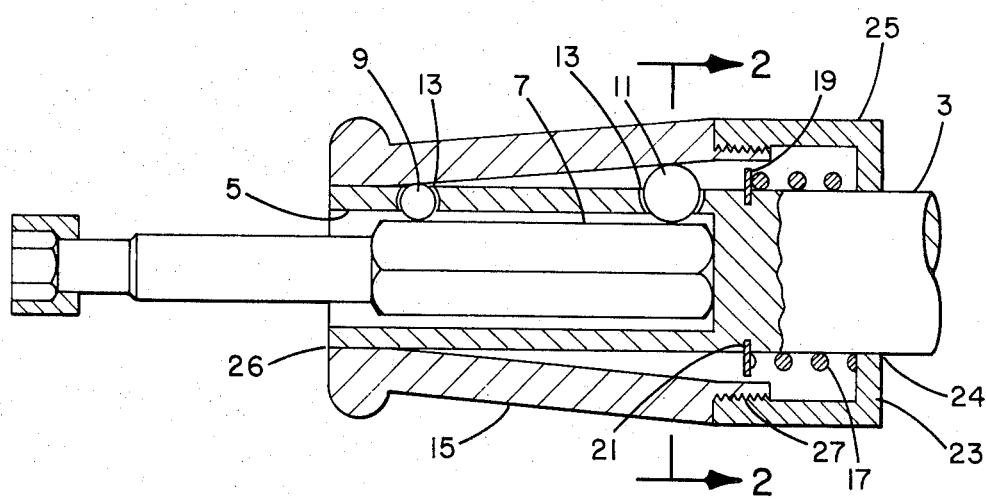
FIG. 1 is an elevational view in section of a ball chuck embodying the present invention.
Figure 2:
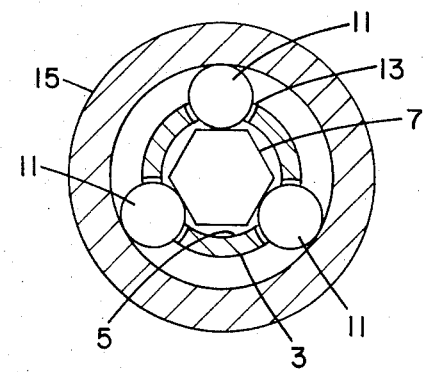
FIG. 2 is a sectional view taken along line 2—2 of FIG. 1.

Referring to the drawing there is illustrated a ball chuck comprising a body member 3 adapted to be rotatably driven by a suitable tool such as an air wrench (not illustrated). The body member is provided with an axial bore or opening 5 for receiving the shank 7 of the tool to be secured within the chuck.

The body member is provided with two sets of radially spaced openings 13 between the outer surface of body member and the axial bore for receiving a first set of three balls 9 and a second set of three balls 11. The openings 13 are sized and shaped so that the balls 9 and 11 will not completely pass through the openings and fall into the bore 5. The balls 9 and 11 have a diameter greater than the wall thickness of body member 3. Further, the balls 11 have a larger diameter than the balls 9 for reasons to be hereinafter explained. The tool shank 7 is shown herein as hexagonal in shape, however, various shaped shanks may be used so long as the appropriate number of balls and openings 13 are also used. For example, with a triangular shaped shank, three balls in each set will function in the same manner as shown for a hexagonal shank, however, with a square shaped shank, four balls in each set would be required for proper alignment. The shape of the shank and the number of balls should be determined so that the balls and the flat surfaces contacted by the balls are equally spaced around the circumference of the body member and the shank respectively. In this manner uniform pressure will be exerted on the balls and on the flat surfaces resulting in a centering of the shank in the axial bore. Also, the need for special orientation of the shank relative to the bore will be eliminated if the shape of the shank is regular or uniform and the spacing of the balls is uniform.

The ball sets 9 and 11 are retained within the openings 13 formed in the body member 3 by a tapered sleeve 15. The sleeve 15 is biased by a compression spring 17 in the direction of increasing taper diameter to force the balls radially inward. The compression spring 17 is axially retained by a snap ring 19 positioned within a groove 21 formed in the body member 3 and a shoulder portion 23 formed in sleeve retainer 25. The retainer portion 25 of the sleeve is secured to tapered portion 15 of the sleeve by threads 27 or other suitable means. A shoulder portion 23 of sleeve retainer 25 encircles body member 3 and has a bearing surface 24 cooperating with body member 3 to allow axial movement of sleeve 15 relative to body member 3. A second bearing surface 26 is located at the opposite end of the sleeve 15 from the bearing surface 24 and also cooperates with the body member 3 to allow axial movement of the sleeve relative to the body member. The two bearing surfaces 24 and 26 are concentric with the tapered surface of the sleeve 15 and the outer surface of the body member 3 is concentric with the center of the axial bore 5. Thus, the sleeve 15 is prevented from any twisting movement and the tapered surface is maintained concentric with the axial bore, assuring uniform pressure of the tapered surface against the balls and against the shank of a tool in the chuck.

The diameter of the balls 9 in relation to the diameter of the balls 11 is proportional to the degree of taper provided within sleeve 15 and the axial centerline distance between balls 9 and balls 11 so that the diameter defined by the inner surfaces of balls 9 is equal to the diameter defined by the inner surfaces of balls 11, irrespective of the axial location of sleeve 15 relative to body member 3. Two ball sets 9 and 11 are shown herein, however, the number of ball sets actually used may be increased so long as there are at least two sets and the balls increase in size proportionately to the taper of sleeve 15. Each set of balls around the body member are in a plane essentially perpendicular to the center line of the body member, with each set of balls axially displaced from each other set along the length of the body member 3.

It can be seen by reference to the drawings that movement of the tapered sleeve in the direction of increasing taper will cause the ball sets to be displaced radially inward for engagement with flat surfaces on the shank of the tool to be retained within the chuck. Since the internal diameter defined by balls 9 and 11 can be varied by the position of the sleeve 15, the chuck will accommodate a variety of tool shanks having a range of dimensional tolerances.

The tool is thus securely held within the chuck, axial forces tending to pull the tool from the chuck causing a corresponding rotational force on the balls which in turn, causes an axial force to be exerted on the tapered sleeve in a direction opposite to the force exerted on the tool. The force exerted on the sleeve will tend to move the sleeve in the direction of increasing taper diameter thereby increasing the radial inward force exerted by the balls on the tool shank.

The two sets of balls, by retaining the shank at axially spaced locations, accurately centers the tool realtive to the chuck and prevents tool "wobble." Further, by providing at least two ball sets with balls of a smaller diameter adjacent the tool end of the chuck, a sleeve having a single, continuous taper may be utilized, thereby decreasing machining costs of the tapered sleeve.

Rotational forces applied to the body member 3 are applied to the shank 7 of the tool through the balls 9 and 11. The pressure of the balls against the flat surfaces of shank with the balls restrained from radial movement by the sleeve 15 prevents relative rotational movement between the tool and the body member 3. The centering and rotational aspect of the chuck provides a working tool of extended length in which the wobble or eccentricity of the tool end is greatly reduced.

While I have described a preferred embodiment of my invention, it is to be understood that the invention is not limited thereto, but may be otherwise embodied within the scope of the following claims:

We claim:

1. A tool chuck comprising:
   a body member adapted to be rotatably driven and having an axial opening for receiving the shank of a tool to be rotated with the body member;
   a series of holes in the body member extending between the outer surface and the axial opening, said holes being spaced equi-distant about the body member in planes perpendicular to the axis of the body member and spaced along the axis of the body member;
   at least two sets of balls mounted in the openings about the body member and extending into the axial opening and beyond the outside surface of the body member with the balls in each set being of the same size and the balls in different sets being of a uniformly larger size along the axis of the body member;
   a sleeve member slidably mounted around the body member and supported on the body member by axially spaced bearing surfaces concentric with the body member;
   the sleeve member having a tapered internal bore sized to engage the surfaces of the balls of each set when the balls are resting on a flat surface of a tool in the opening of the body member; and
   means to urge the sleeve member along the outer surface of the body member to force the tapered surface against the balls of each set.

2. A chuck for securing a tool having a shank portion with flat surfaces equally spaced about the circumference in a rotatable drive member comprising:
   a cylindrical body member adapted to be rotatably driven and having an outer surface and an axial bore of a size sufficient to receive the shank of the tool to be secured, the outer surface and the bore being concentric about the axis of the body member;
   a series of openings in the body member extending from the outer surface of the body member into the axial bore, said openings being arranged in sets about the circumference of the body member in relation to the position of flat surfaces on the tool shank, with each set of openings spaced axially along the body member;
   a series of sets of balls located in the openings about the body member and extending from a point outside the body member into the axial bore, each set of balls being the same size and the balls in different sets uniformly increasing in diameter along the axial length of the body member;
   a sleeve mounted around and slidably supported on the body member by axially spaced bearing surfaces, said sleeve having an internal surface tapered proportionately to the diameters of the balls in the body member openings whereby the tapered surface contacts the balls of different sets when the balls bear against the flat surfaces of a tool shank in the axial bore of the body member; and
   means to releasably urge the sleeve along the outer surface of the body member to force the tapered surface against the balls of each set.

3. The chuck of claim 2 wherein there are two sets of balls with three balls in each set.

* * * * *